Dec. 9, 1924.
W. G. PERRY
PLOWFENDER ADJUSTER
Filed Sept. 12, 1923
1,518,352
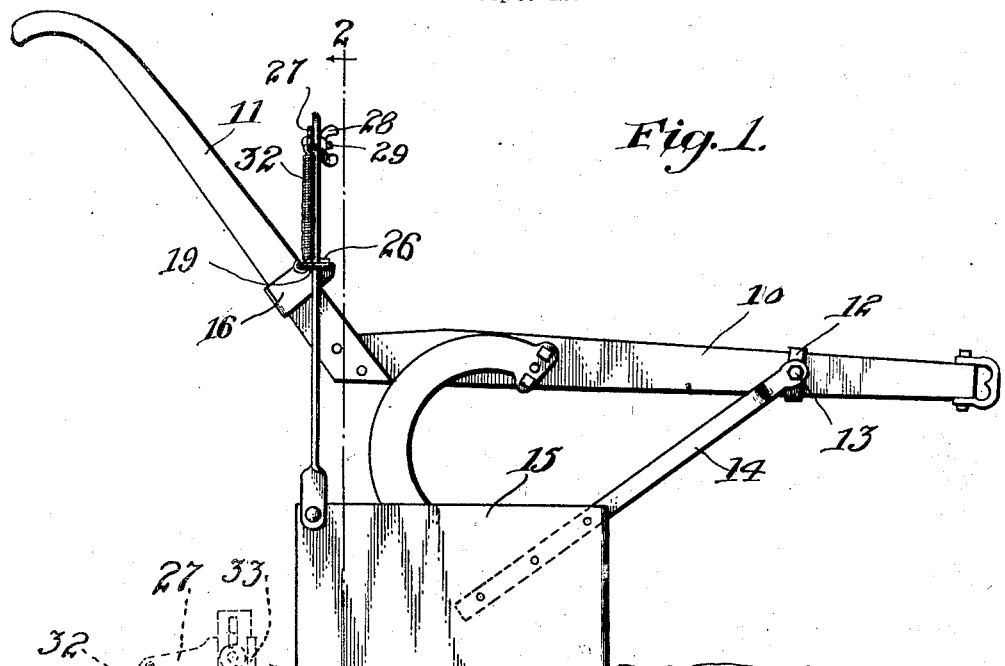
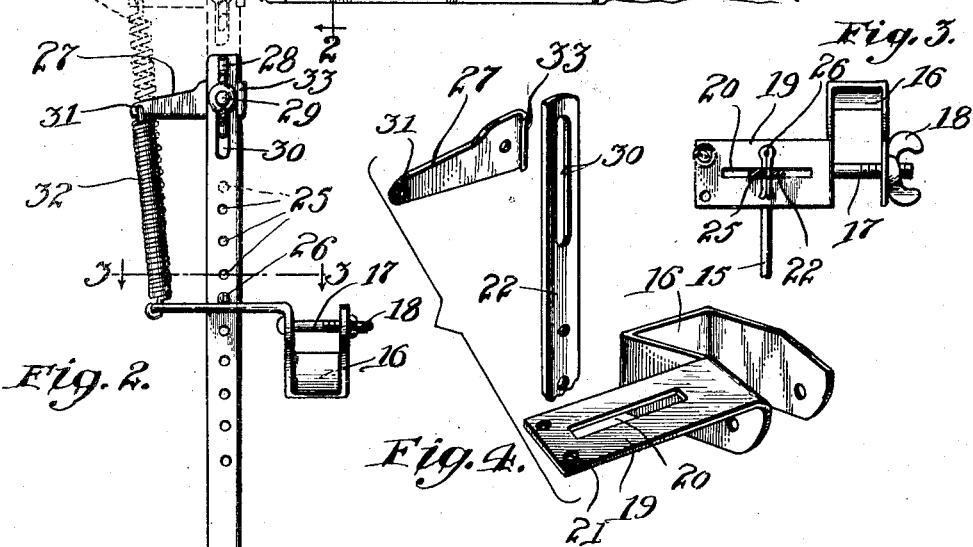
W. G. Perry,
Inventor
Attorney Patented Dec. 9, 1924.

1,518,352

UNITED STATES PATENT OFFICE.

WILLIAM G. PERRY, OF TEMPLE, GEORGIA, ASSIGNOR OF ONE-HALF TO GEORGE M. DURRETT AND ONE-HALF TO WILEY L. ADCOCK, BOTH OF TEMPLE, GEORGIA.

PLOWFENDER ADJUSTER.

Application filed September 12, 1923. Serial No. 662,292.

*To all whom it may concern:*

Be it known that I, WILLIAM G. PERRY, a citizen of the United States, residing at Temple, in the county of Carroll and State of Georgia, have invented certain new and useful Improvements in Plowfender Adjusters, of which the following is a specification.

My invention relates to plow fender attachments.

An important object of the invention is to provide a device of the above mentioned character, which will allow of a large range of adjustment.

Another object of the invention is the provision of a device of this character which will yieldingly hold the plow fender pressed against the ground and keep dirt, stones, and the like from going under the fender and harming the plants.

A further object of the invention is to provide a device of the above mentioned character, which is simple in construction, convenient in use, strong and durable.

Other objects and advantages of the invention will be apparent during the course of the following description.

In the accompanying drawings forming a part of this specification, and in which like numerals are employed to designate like parts throughout the same.

Figure 1 is a side elevation of a plow equipped with my improved device.

Figure 2 is a vertical section on line 2—2 of Figure 1,

Figure 3 is a horizontal section on line 3—3 of Figure 2, and,

Figure 4 is a detail perspective, parts broken away.

In the drawings, wherein for the purpose of illustration is shown a preferred embodiment of my invention, the numeral 10 designates the beam of a plow of the usual construction, and 11 designates the handles.

A suitable clamp 12 is secured to the beam, forwardly of the plow share, to which is pivoted at 13, the arm or bar 14 which carries the fender 15.

A substantially U-shaped clamp 16 is adapted to encircle the handle 11 of the plow, and is provided with a bolt 17 and nut 18, to secure it thereto. The clamp 16 is provided with a horizontal laterally extending arm 19, preferably formed integral therewith, and provided with an elongated slot 20 and with openings 21, for a purpose to be described. An upright bar or link 22 has its lower end twisted and forked, as at 23 to receive the rear end of the fender 15, and a bolt or pin 24 serves to pivotally connect them. The bar or link 22 extends upwardly through the slot 20 for a considerable distance, and is provided with a series of openings 25, and a pin 26 is carried in a selected opening 25 and is adapted to rest on the arm 19 to limit the downward movement of the bar 22, but which will not prevent its upward movement.

A laterally extending arm 27 is adjustably secured to the upper end of the bar 22 by means of the wing nut 28 and bolt 29, which passes through the arm 27 and through an elongated slot 30 in the bar 22. The arm 27 has an opening 31 in its outer end to receive the end of a retractile coil spring 32, the lower end of which is hooked through the opening 21 in the arm 19. The arm 27 is provided with a flange 33, which bears against the rear edge of the bar, to prevent the arm from turning, due to the tension of the spring.

In operation, when the fender 15 strikes an obstruction it may move upwardly against the tension of the spring 32 and when the obstruction is passed, the spring will return the fender to its normal position, and will serve to retain the fender in proper engagement with the ground. The pin 26 serves to limit the downward movement of the bar, when the plow share is moved upwardly out of engagement with the ground.

The slot 30 and associated elements permit of the vertical adjustment of the arm 27, which will regulate the tension of the spring 32. This device is capable of installation upon numerous forms of plows now in use, and it may be used upon either side of the plow, as desired, as the parts are reversible.

It is to be understood that the form of my invention herewith shown and described is to be taken as a preferred example of the same, and that various changes in the shape, size, and arrangement of parts may be resorted to without departing from the spirit of my invention, or the scope of the subjoined claims.

Having thus described my invention, what I claim is:

1. The combination with a guard to be arranged near a plow share, of adjustable means connecting the guard with the plow beam, an arm mounted upon one handle of the plow and having an opening formed therein, a bar slidable within the opening and having longitudinally spaced openings, means pivotally connecting the bar and guard, a stop element arranged above the arm and inserted within a selected opening of the bar, an upper laterally extending arm carried by the bar, means for connecting the upper arm with the bar so that the arm may be shifted longitudinally thereof and locked thereto at a selected elevation, and a retractile coil spring connecting the upper and lower arms.

2. The combination with a fender to be arranged near a plow share, of adjustable means connecting the fender with the plow beam, a clamp removably mounted upon the handle of the plow and having a substantially horizontal lateral arm provided with a slot, a bar slidable within the slot and having longitudinally spaced openings, means pivotally connecting the lower end of the bar and fender, an upper substantially horizontal arm adapted to be mounted one side of the bar and having a flange to engage with one edge of the bar, means to detachably clamp the upper arm to the bar at a selected elevation, and a retractile coil spring connecting the upper and lower arms.

In testimony whereof I affix my signature.

WILLIAM G. PERRY.